US006957596B2

(12) United States Patent
Kopetzky et al.

(10) Patent No.: US 6,957,596 B2
(45) Date of Patent: Oct. 25, 2005

(54) APPARATUS AND METHOD FOR BRAKING ERGONOMIC SUPPORT ACTUATOR

(75) Inventors: Robert Kopetzky, Lauf (DE); Richard Frank, Elchingen (DE)

(73) Assignee: L&P Property Management Company, South Gate, CA (US)

( * ) Notice: Subject to any disclaimer, the term of this patent is extended or adjusted under 35 U.S.C. 154(b) by 208 days.

(21) Appl. No.: 10/280,779

(22) Filed: Oct. 25, 2002

(65) Prior Publication Data

US 2004/0080196 A1   Apr. 29, 2004

(51) Int. Cl.⁷ .............................. F16C 1/10; A47C 3/05
(52) U.S. Cl. .............................. 74/501.5 R; 74/501.6; 74/502.2; 74/505; 74/506; 297/284.4; 188/2 D; 188/2 F; 188/17; 188/19; 188/26; 242/382.2
(58) Field of Search ........................ 74/501.5 R, 501.6, 74/505, 506, 502.2; 297/284.4; 188/19, 2 D, 188/2 F, 17, 26; 242/382.2

(56) References Cited

U.S. PATENT DOCUMENTS

| | | | |
|---|---|---|---|
| 823,971 A | 6/1906 | Remondy | |
| 3,631,951 A | 1/1972 | Quenneville | 192/8 C |
| 3,726,370 A | 4/1973 | Hubbard Jr. | 192/8 C |
| 3,750,851 A * | 8/1973 | Ruther et al. | 188/26 |
| 3,759,358 A | 9/1973 | Quenneville | 192/8 C |
| 3,796,292 A | 3/1974 | Harrison | 192/8 C |
| 3,876,184 A | 4/1975 | Eudy | 254/150 R |
| 4,014,422 A | 3/1977 | Morishita | 192/67 R |
| 4,316,631 A | 2/1982 | Lenz et al. | 297/284 |
| 4,354,709 A | 10/1982 | Schuster | 297/284 |
| 4,494,709 A | 1/1985 | Takada | 242/107.6 |
| 4,561,606 A | 12/1985 | Sakakibara et al. | 242/107 |
| 4,614,257 A | 9/1986 | Harada et al. | 192/8 C |
| 4,778,138 A | 10/1988 | Yamada | 248/421 |
| 4,786,110 A | 11/1988 | Mahling et al. | 297/362 |
| 4,817,771 A | 4/1989 | Iten | 192/16 |
| 5,010,780 A | 4/1991 | Hatfield | 74/501.5 R |
| 5,050,930 A | 9/1991 | Schuster et al. | 257/284 |
| 5,080,434 A | 1/1992 | Locher | 297/301 |
| 5,186,412 A | 2/1993 | Park | 242/245 |
| 5,197,780 A | 3/1993 | Coughlin | 297/284.7 |

(Continued)

FOREIGN PATENT DOCUMENTS

DE           29 47 472         8/1980        ............ B60N 1/00

(Continued)

OTHER PUBLICATIONS

Merriam Webster's Collegiate Dictionary, Tenth Edition, 1999, p. 393.*

Primary Examiner—Vinh T. Luong
(74) Attorney, Agent, or Firm—Grant D. Kang; Dennis J. M. Donahue, III; Husch & Eppenberger LLC

(57) ABSTRACT

A braking actuator for an ergonomic support is connected thereto by a Bowden cable. The actuator has a housing with pin slots, friction surfaces and a mount for a disk axle. A disk has frictional surfaces, holes with pin load edges, a Bowden cable wire seat that holds the Bowden cable end and an axle that is supported by the mount in the housing. The friction surfaces of the disk and housing engage each other to brake the actuator and the ergonomic support. A lever having pins is disposed on the housing such that the pins extend through the pin slots to engage the holes in the disk. Turning the lever disengages the friction surfaces and rotates the disk, thereby moving the ergonomic support. Releasing the lever engages the frictional surfaces such that movement of the ergonomic support is braked at a selected position.

20 Claims, 5 Drawing Sheets

U.S. PATENT DOCUMENTS

| | | | |
|---|---|---|---|
| 5,211,368 A | 5/1993 | Kitamura | 248/292.1 |
| 5,217,278 A | 6/1993 | Harrison et al. | 297/284.7 |
| 5,248,017 A | 9/1993 | Schwarzbich | 192/8 R |
| 5,382,076 A | 1/1995 | Scheck et al. | 297/354.12 |
| 5,397,164 A | 3/1995 | Schuster et al. | 297/284.1 |
| 5,449,219 A | 9/1995 | Hay et al. | 297/284.4 |
| 5,456,336 A * | 10/1995 | Bopp | 188/17 |
| 5,522,488 A | 6/1996 | Schwarzbich | 192/8 R |
| 5,567,010 A | 10/1996 | Sparks | 297/284.4 |
| 5,567,011 A | 10/1996 | Sessini | 297/284.7 |
| 5,593,210 A | 1/1997 | Schwarzbich | 297/361.1 |
| 5,609,394 A | 3/1997 | Ligon, Sr. et al. | 297/284.4 |
| 5,638,722 A | 6/1997 | Klingler | 74/502.4 |
| 5,681,005 A | 10/1997 | Ligon, Sr. et al. | 242/394.1 |
| 5,704,687 A | 1/1998 | Klingler | 297/284.4 |
| 5,769,491 A | 6/1998 | Schwarzbich | 297/284.4 |
| 5,794,479 A | 8/1998 | Schwarzbich | 74/143 |
| 5,842,659 A | 12/1998 | Ligon, Sr. et al. | 242/394.1 |
| 5,984,334 A * | 11/1999 | Dugas | 280/250.1 |
| 6,045,185 A | 4/2000 | Ligon, Sr. et al. | 297/284.4 |
| 6,050,641 A | 4/2000 | Benson | 297/284.4 |
| 6,109,556 A * | 8/2000 | Kopetzky et al. | 242/382.2 |
| 6,158,300 A | 12/2000 | Klingler | 74/526 |
| 6,178,838 B1 | 1/2001 | Schwarzbich | 74/143 |
| 6,227,617 B1 | 5/2001 | von Möller | 297/284.4 |
| 6,230,867 B1 | 5/2001 | Schwarzbich | 192/223.2 |
| 6,238,123 B1 | 5/2001 | Schwarzbich | 403/45 |
| 6,345,549 B1 | 2/2002 | Lance | 74/500.5 |
| 6,378,663 B1 * | 4/2002 | Lee | 188/2 F |
| 6,481,540 B1 * | 11/2002 | Nolting et al. | 188/19 |

FOREIGN PATENT DOCUMENTS

| | | | | |
|---|---|---|---|---|
| EP | 0 006 840 B1 | 2/1982 | | A47C 23/00 |
| EP | 0 322 535 A1 | 7/1989 | | A47C 7/46 |
| EP | 000635407 A1 * | 1/1995 | | 75/501.5 R X |
| EP | 0 885 164 B1 | 7/2002 | | B65H 75/30 |

* cited by examiner

APPARATUS AND METHOD FOR BRAKING ERGONOMIC SUPPORT ACTUATOR

STATEMENT REGARDING FEDERALLY SPONSORED RESEARCH OR DEVELOPMENT

Not Applicable.

CROSS-REFERENCE TO RELATED APPLICATIONS

None.

APPENDIX

Not Applicable.

BACKGROUND OF THE INVENTION

1. Field of the Invention

The invention is an actuator used to move and hold ergonomic supports for seats and chairs.

2. Related Art

Automobile and furniture seats frequently include ergonomic supports, such as lumbar supports. There are several types of lumbar supports, including arching pressure surfaces, See, e.g. U.S. Pat. No. 5,397,164, push paddle type lumbar supports, See, e.g. U.S. Pat. No. 4,295,681, and strap type supports, See, e.g. U.S. patent application Ser. No. 09/485,738. The common features shared by all these varieties of ergonomic support include being continuously positionable and being operated by an actuator installed on an exterior surface of the seat so that it can be controlled by person sitting in the seat. Many of these actuators are manual, mechanical devices.

Continuously positionable ergonomic supports have a range of motion. The support device can be moved through its range of motion by the actuator in continuous, stepless fashion. The actuators for these supports include a variety of clutches or brakes so that any position in the range of motion that the user finds comfortable may be held in place by the actuator.

The actuators move and hold the ergonomic supports by means of traction cables in the majority of cases. The most common traction cable is a Bowden cable. A Bowden cable is a flexible conduit or sleeve. A wire is disposed inside the sleeve and is axially slideable through it. At one end of the Bowden cable, the sleeve end is mounted on one part of the ergonomic support and the wire end is mounted on another part of the ergonomic support. Traction drawing the wire through the sleeve moves the ergonomic support and the release of tension on the Bowden cable wire allows the ergonomic support to return through the same range of motion in reverse.

At the other end of the Bowden cable, an actuator must be able to pull the Bowden cable wire through the Bowden cable sleeve in order to move the ergonomic support through its range of motion. The actuator must further be able to hold ergonomic support in the users selected position against the traction exerted on the Bowden cable wire by the pressure of the user sitting on it.

Prior art actuators achieve these design goals through mechanisms that were complex, and therefore expensive, See, for example, U.S. Pat. No. 5,794,479, U.S. Pat. No. 6,178,838, U.S. Pat. No. 6,230,867 B1. The use of such overrunning clutches, ratchets, bearings, and eccentric rings involve a large number of parts, increasing the expense of the actuator both in terms of the number of parts required and their assembly. Moreover, such devices do not wear well and tend to break or slip after a number of use cycles shorter than the predicted lifetime of the seat in which they are installed. There is a need in the industry for an ergonomic support actuator that reduces cost, decreases complexity, and increases durability.

SUMMARY OF THE INVENTION

The present invention is a braking ergonomic support actuator. It is manual. The user turns a lever in order to put traction on a Bowden cable to actuate a continuously positionable ergonomic support device.

The braking actuator is comprised of a housing, a disk and a lever having pins. A Bowden cable sleeve is mounted on the exterior of the housing. The Bowden cable wire is mounted on the disk which is disposed to rotate within the housing. The lever has pins that extend through slots in the housing and engage the disk to put actuating pressure on it.

The housing and disk have complementary friction surfaces. The Bowden cable wire is mounted on the disk so that rotation of the disk in a first direction exerts tractive force on the wire and rotation of disk in the opposite direction releases tension on the wire. This force is imparted to the disk by the user turning the lever, causing the pins to push the disk. The engagement of the friction surfaces on the disk with the friction surfaces on the housing are sufficient to brake the rotation of the disk against the return pressure on the wire exerted by the pressure of the seat occupant on the ergonomic support surface. The braking friction surfaces are given mechanical advantage over the force on the Bowden cable wire by being placed at a greater radial distance from the axis of the disk than the seat of the Bowden cable wire.

In order that the ergonomic support surface may be moved from where it is held in a selected position, the actuator must be able to release the brake. This is achieved by raising the disk out of its frictional engagement with the housing. In one preferred embodiment, the edge of the disk is a wedge. The edges of the wedge are frictional surfaces. The pressure of the ergonomic support on the Bowden cable wire forces the wedge into the corresponding wedge seat. The wedge seat is comprised of the frictional surfaces of the housing. In order to release the braking effect of this frictional engagement, the lever must move the disk upwards out of the wedge seat, against the force of the Bowden cable wire. This raising motion is immediately followed by a rotating force, which is also applied to the disk by the lever. A first direction of this rotating force will exert extra traction on the Bowden cable wire moving the ergonomic support through its range of motion in a first direction. In the other direction, the lever turns the disk to release tension upon the Bowden cable wire, returning the ergonomic support through its range of motion.

The lever has pins fixedly attached to it. These pins are parallel to the axis of the disk and extend through slots in the housing. Inside the housing, the pins engage holes in the disk. The edges of these holes comprise loading surfaces against which the pins push to first release the brake and secondly move the disk in one rotational direction or the other. In one preferred embodiment, there are two pins, two pin slots in the housing and two loading surface holes to receive the pins in the disk. In one preferred embodiment, the loading surface holes are oblong and nonparallel, in order that the disk may quickly respond to pressure on the pins.

The disk has an axle which is mounted in an axle housing seat. In order to allow the slight but necessary upwards movement of the disk out of engagement with the frictional surfaces of the housing, thereby releasing the brake, the axial housing mount for the disk axle is oval shaped. This shape gives the disk axle room to move upwards, and thereby to move the disk up and out of braking engagement with the housing.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
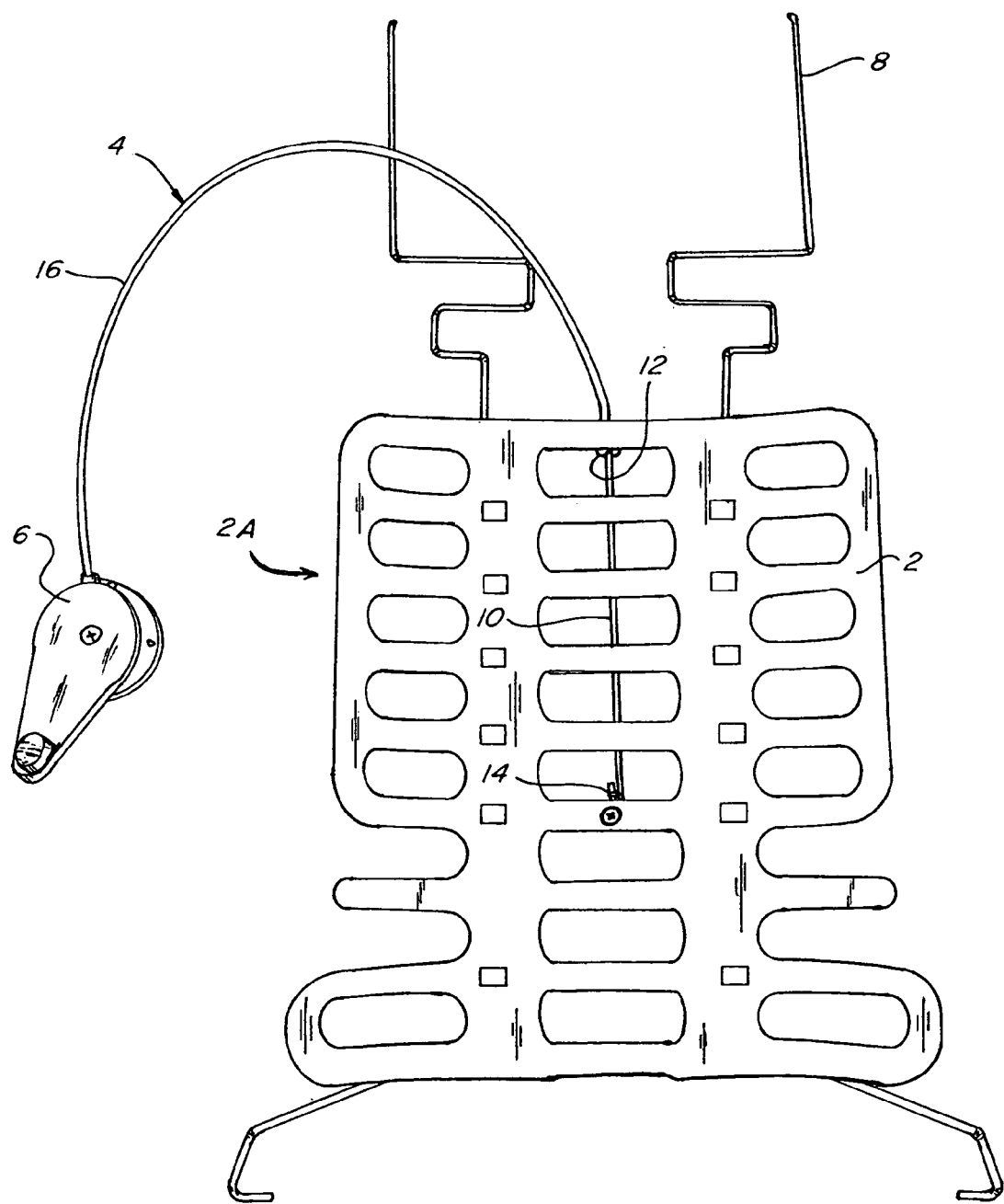
FIG. 1 depicts a continuously positionable ergonomic support device connected by a Bowden cable to an actuator.

Referring to the accompanying drawings in which like reference numbers indicate like elements, FIG. 1 illustrates a continuously positionable lumbar support and its relationship to a Bowden cable 4 and actuator 6. The pressure surface 2 is mounted to guide rails 8 and at least one portion of the arching pressure surface 2 slides up and down along guide rails 8. Bowden cable 4 includes a Bowden cable wire 10. A Bowden cable sleeve 16 is mounted to one end of the arching pressure surface 2 at a sleeve mount 12. The Bowden cable wire 10, which slides axially through the Bowden cable sleeve 16, is mounted to another portion of the arching pressure surface 2, at Bowden cable wire mount 14. When actuator 6 is engaged, it puts traction on the Bowden cable wire 10 drawing it axially into Bowden cable sleeve 16. This is turn puts tractive force on the arching pressure surface 2 at the Bowden cable wire mount 14 drawing it and the Bowden cable sleeve mount 12 closer together. This causes the arching pressure 2 to bow or arch outwards towards a seat occupant as one or both portions of the arching pressure surface 2 slide along guide rails 8.

Generally, most ergonomic supports 2A have a natural bias towards a flat position. This bias is contributed to by forces (F1) including the pressure of the seat occupant on the lumbar support, a natural bias of the arching pressure surface 2 (or analogous members in other systems) towards a flat position, and, alternatively, by springs (not shown). Accordingly, when in use in any position besides the flat position, there will be a force exerted on the Bowden cable wire 10 pulling it outwards from the Bowden cable sleeve 16. The sliding motion of the arching pressure surface 2 is continuous, without steps, so that a user may select any position along a continuous range of positions through the device's entire range of motion.

Figure 2:
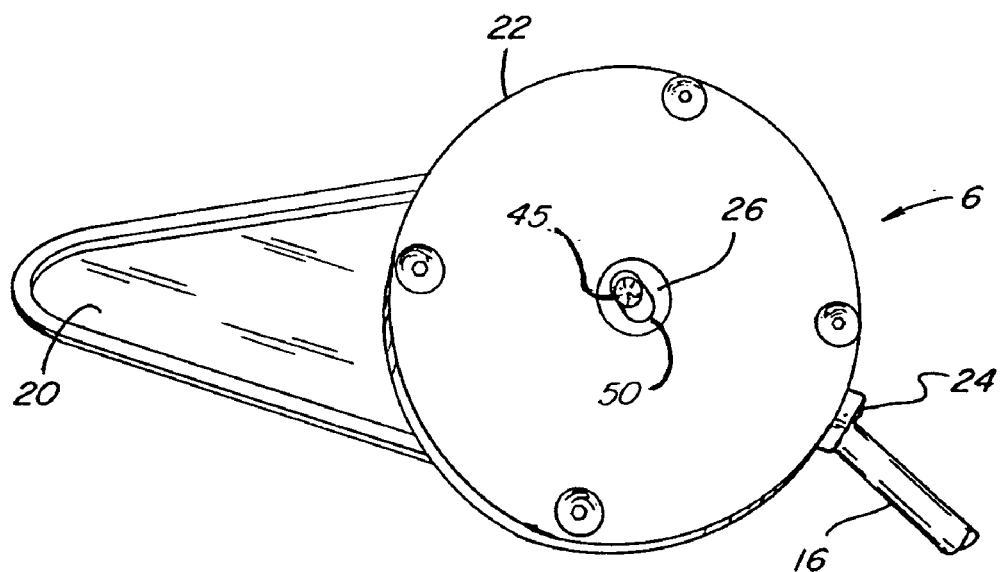
FIG. 2 depicts a braking actuator assembled.

FIG. 2 depicts the assembled braking actuator 6. Lever 20 is rotatably engaged with housing top 22 by any of a variety of methods, for example, annular bosses and detents (not shown). Also visible are Bowden cable sleeve 16 and, Bowden cable sleeve mount 24. In the center of housing top 22 is an oval shaped disc axle mount 26.

Figure 3:
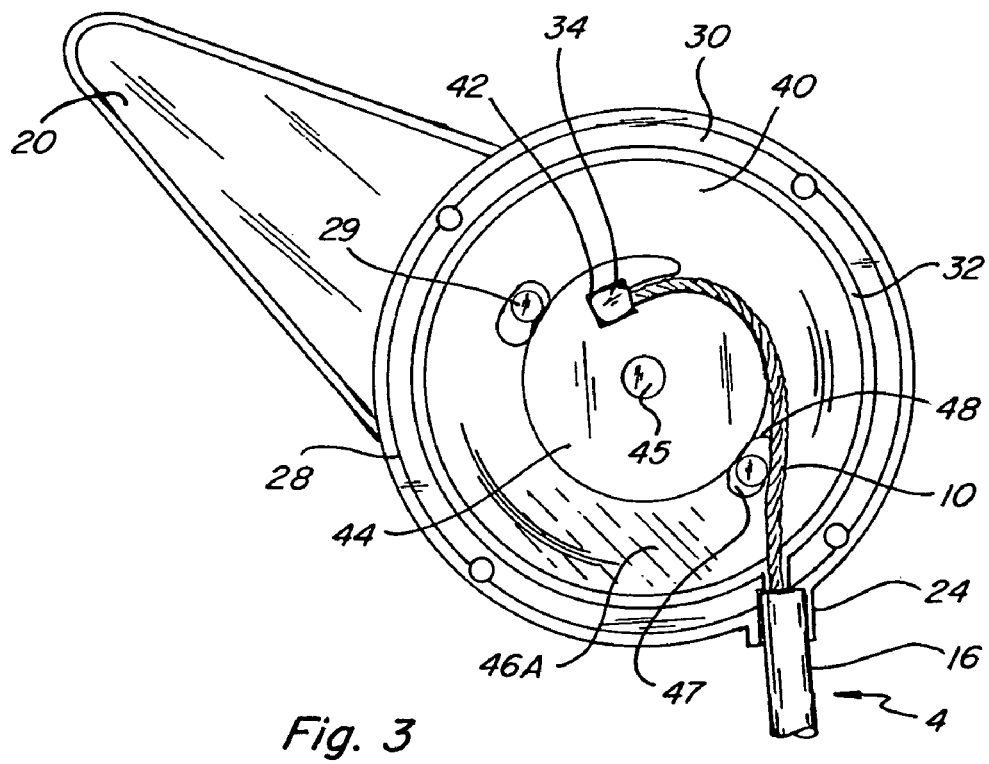
FIG. 3 illustrates a top view of the braking actuator with the top housing removed.

FIG. 3 is a top view of the braking actuator with the top section of housing 22 removed.

Visible are housing bottom half 30, disk 40 and the small gap between them 32. Lever 20 is fixedly attached (preferably molded as a single piece), to lever mounting ring 28, which circumscribes housing bottom 30 and is in rotatable engagement with it. Bowden cable sleeve 16 is attached to housing bottom 30 at Bowden cable mount 24. Bowden cable wire 10 extends from sleeve 16 into the space provided for it within the actuator housing between housing top 22 and housing bottom 30. Bowden cable wire 10 includes a Bowden cable wire bullet 34 at its end, for mounting. Bowden cable wire bullet 34 is mounted in Bowden cable wire seat 42. Bowden cable wire bullet seat 42 is an integral part of Bowden cable wire cam 44. Disc 40 also includes disc axle 45. In the depicted embodiment, these structures are molded plastic.

Crosshatching indicates the friction surface 46A of disc 40. The friction surface 46A may be any size, shape or configuration, provided that is oriented in relation to Bowden cable wire 10, Bowden cable wire cam 44 and Bowden cable wire seat 42 such that tension on the Bowden cable will bring the friction surface 46A into braking engagement with the corresponding friction surfaces (shown below) on braking actuator housing halves 22 and 30.

Disc 40 also includes holes 47. These holes receive insertion of lever pins 29. The edges 48 of holes 47 are loading surfaces against which pins 29 will exert rotational force when lever 20 is turned.

Figure 4:
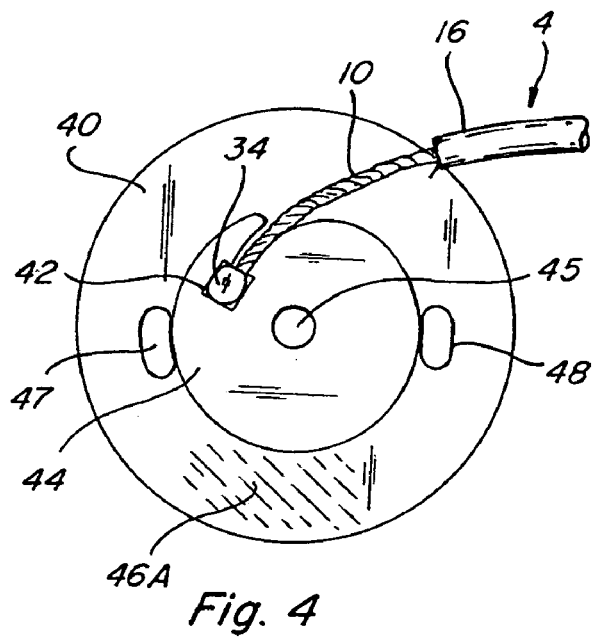
FIG. 4 illustrates a top view of the braking actuator disk.

FIG. 4 is a top view of disc 40 removed entirely from the breaking actuator housing but still engaged with Bowden cable 4. From Bowden cable sleeve 16, Bowden cable wire 10 extends to where Bowden cable wire end bullet 34 is seated in wire bullet seat 42, which is molded into Bowden cable wire cam 44. Edges 48 define holes 47 for receiving insertion of the pins (not shown in FIG. 4) that exert rotational pressure upon turning of the lever (also not shown in FIG. 4). Crosshatching indicates friction surface 46.

Figure 5:
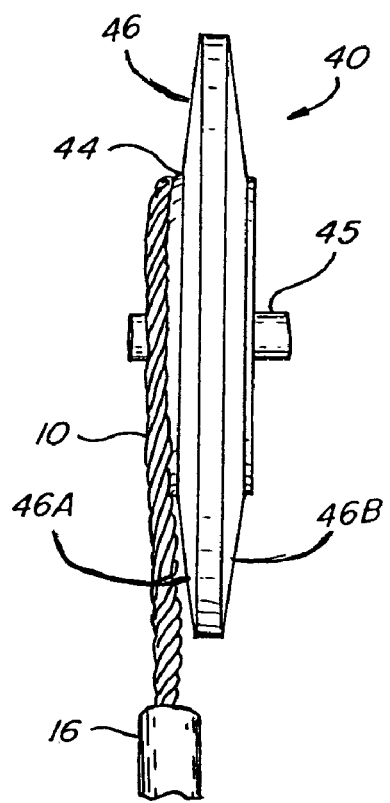
FIG. 5 illustrates a side view of the braking actuator disk.

FIG. 5 is a side view of disc 40 removed from the braking actuator. Visible are disk axle 45, the Bowden cable wire cam 44, Bowden cable wire 10 and Bowden cable wire sleeve 16. FIG. 5 depicts an embodiment in which the annular surfaces of disk 40 outside the Bowden cable wire cam 44 are angled or wedge shaped. A portion of these surfaces of disk 40 comprises a frictional surfaces not visible in FIG. 5.

Figure 6:
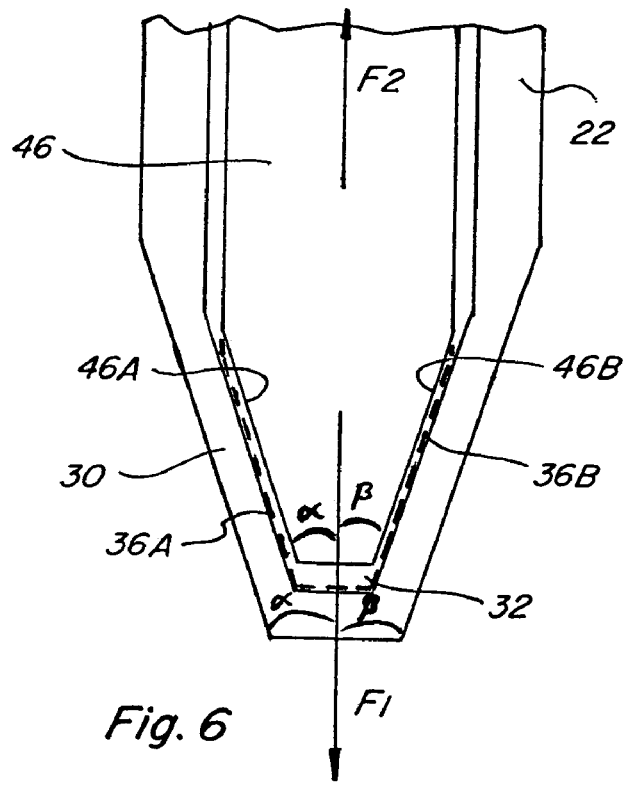
FIG. 6 is a schematic side view close up of the interaction of the braking actuator disk with the braking actuator housing friction surface.

FIG. 6 is a schematic, cut away side view of the interaction between the frictional surfaces of the braking actuator. Disk 40 includes frictional surfaces 46A and 46B. The cross sectional profile of disk 40 may be any of a wide variety of shapes. In the depicted embodiment, the angles ($\alpha$, $\beta$) of the edges of disk 40 comprise a wedge shape where the frictional surfaces of 46A and 46B are. Complementary angles ($\alpha$, $\beta$) in the top and bottom of the housing form a wedge seat, which is created by assembly of housing bottom half 30 with housing top half 22, sandwiching the disk 40 between them.

In operation, when tension on Bowden cable 10 draws disk 40 into the wedge shape frictional seat 36, as indicated by arrow F1 (position shown by broken lines), frictional surfaces 36A and 36B and frictional surfaces 46A and 46B come into contact and prevent rotation of disk 40. Accordingly, further motion of Bowden cable wire 10 relative to Bowden cable sleeve 16 is braked. Consequently, any further motion of the continuously positionable ergonomic support attached to the Bowden cable is also braked. When an opposite force indicated by arrow F2 lifts frictional surfaces 46A and 46B away from frictional surfaces 36A and 36B, creating gap 32 between them, the disk 40 is free to turn within housing 30-22. When disk 40 is free to turn, it is correspondingly free to increase or release tractive force on Bowden cable wire 10 through a Bowden cable wire sleeve 16 and, correspondingly, move the ergonomic support.

Figure 7:
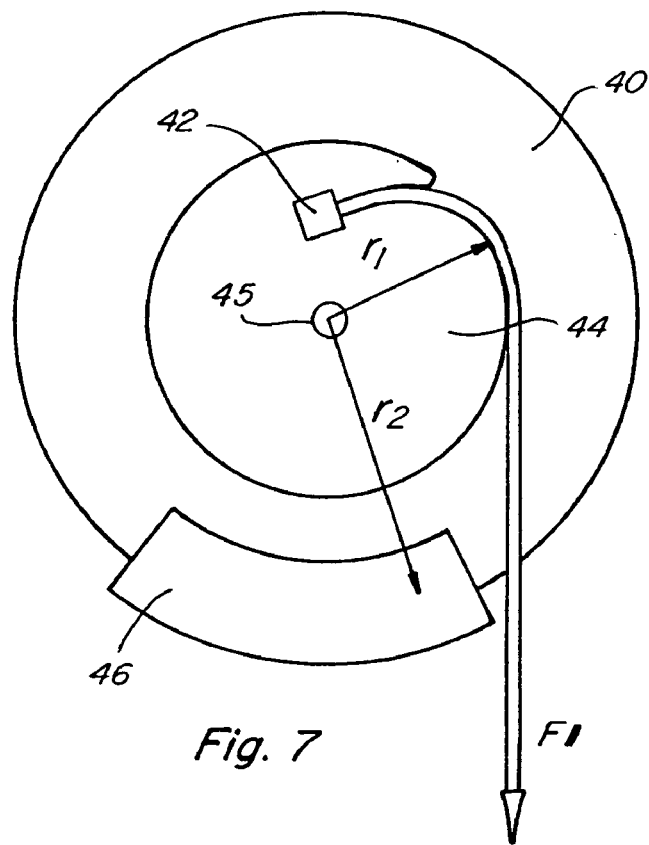
FIG. 7 is a schematic top view of the braking actuator disk's interaction with the Bowden cable wire and the housing friction surface.

FIG. 7 is a schematic top view of the disk 40 illustrating the mechanical advantage given to the braking action by the disk's design. When the friction surface 46 is placed outboard of the Bowden cable wire cam 44, its greater radius r2 from the axle 45 of the disk 40 gives it a greater leverage than the wire, having the shorter radius r1. This represents a mechanical advantage over prior art braking or clutch actuators, wherein the cable wire attachment typically has the same radius as any brake or clutch and in some cases has a smaller radius. By building in such mechanical advantage, the same forces can be controlled with less expensive components.

Figure 8:
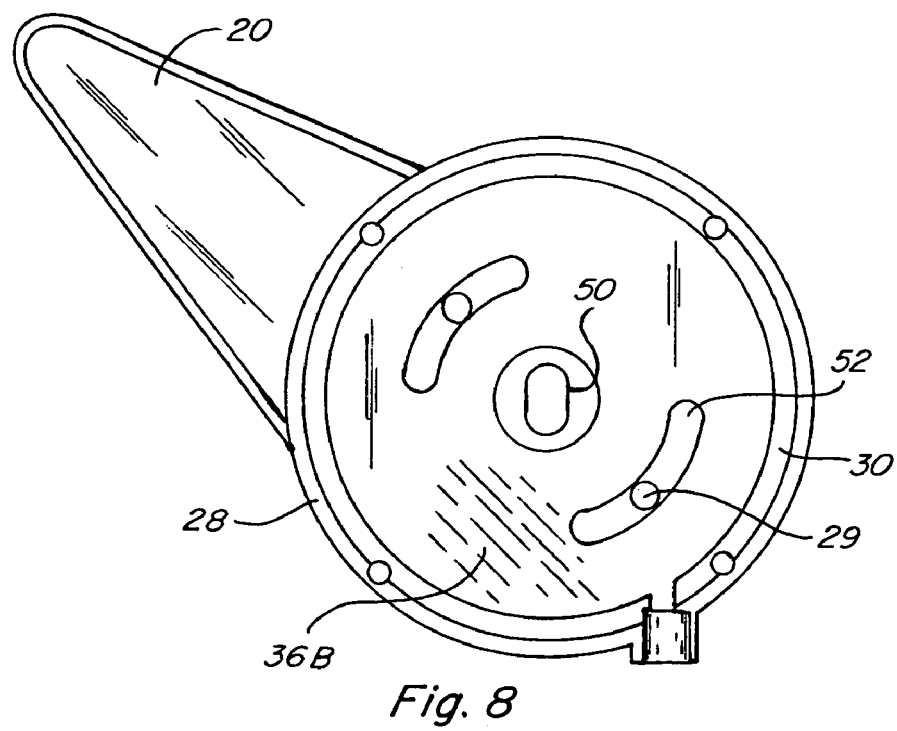
FIG. 8 is a perspective view of the braking actuator with the housing top and disk removed.

FIG. 8 is top/perspective view of the housing lower half 30 and lever 20 with both the housing top half 22 and disk 40 removed. Visible in housing 30 are the oval disk axial mount 50, frictional surface 36B and pin slots 52. Unlike holes 47 in disk 40, pins slots 52 in housing lower half 30 do not have edges that are intended to be acted upon by the pins 29. No loads will be transferred through the edge of pins slots 52. Rather, these slots simply allow access of the pins 29 through housing lower half 30 to the loading surfaces 48, the edges of holes 47 in disk 40. This is self evident by the length of pin slots 52 and their curvilinear coordination with the axis of rotation of the lever 20 to which lever pins 29 are attached.

Oval disk axle mount 50 allows disk 40 to move a sufficient amount in order that the action of lever 20 through lever pins 29 may raise disk 40 out of braking contact with the frictional surfaces 36B and 36A (not shown in FIG. 8). In the depicted embodiment, the preferred orientation of the oval is with its long axis generally perpendicular to the frictional surfaces 36 and 46, in order to provide room for lifting disk 40. Although an oval is the depicted embodiment, any shape that does not constrain disk axle 45, and that allows its movement away from the braking contact of the friction surfaces, may be used.

Figure 9:
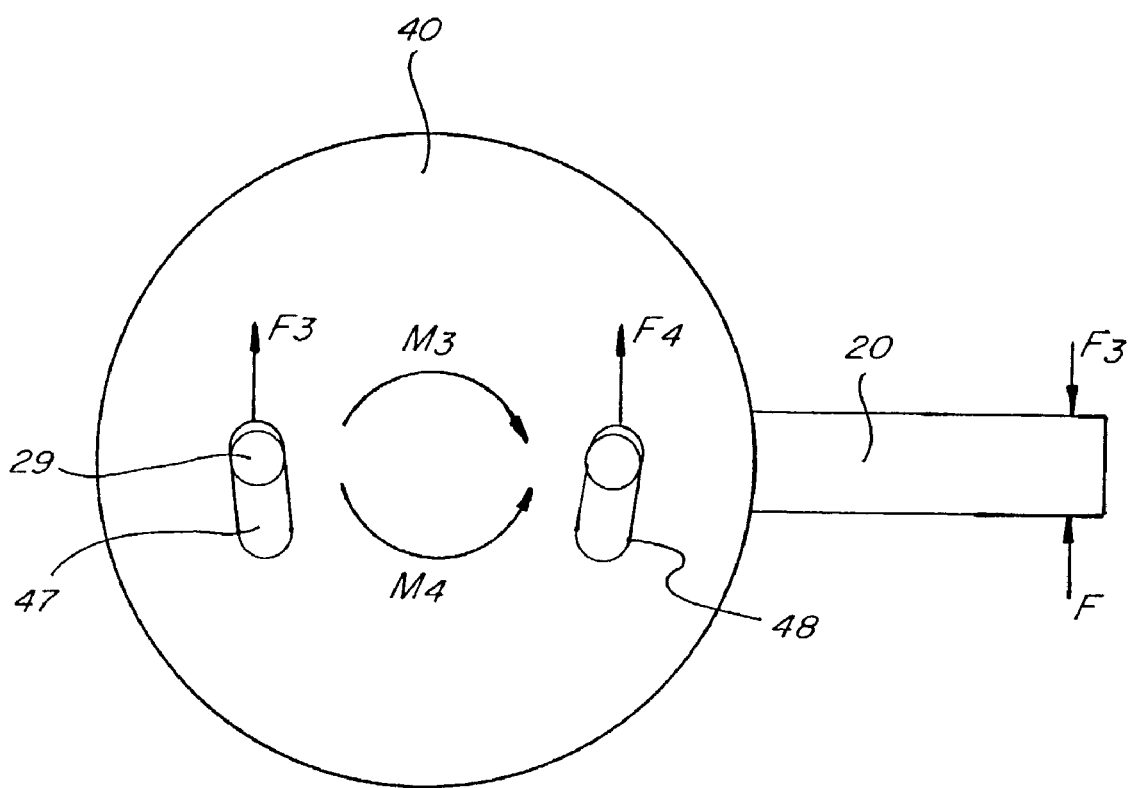
FIG. 9 is a schematic view of the disk depicting its interaction with the lever pins.

FIG. 9 is a schematic top view of the disk 40 and lever 20. Pins 29 are fixedly attached to lever 20. They extend upwards (out of the page in FIG. 9) through pin slots 52 (not shown) and housing bottom 30 (not shown) and into holes 47 in disk 40. Upon rotation of lever 20 by a user/seat passenger, pins 29 come into engagement with the edges 48 of holes 47 in disk 40, which edges 48 act as load bearing surfaces for the forces of the lever 20 on the disk 40. When the lever is pushed in the direction indicated by arrow F3, the force indicated by arrow F3 is exerted on disk 40 rotating it in the direction of torque M3. When the lever is acted upon with force in direction F, pins 29 exert a force F4 on disk 40, rotating it with a torque in direction M4.

It is within the scope of the present invention that various embodiments of the invention may vary the relative leverage asserted by each of pins 29 in a variety of ways. First, lever 20 may be mounted on housing 22/30 in a variety of ways, including an annular detent and boss arrangement, a centered axial rotational fixation, or an eccentric fixation to the housing. In the depicted embodiment, holes 47 are elongated, to allow some movement of pins 29 in them. The long axis of holes 47 in the depicted embodiment are nonparallel, in order that the pins 29 may engage edges 48 more immediately and reduce any perceived response delay or "slack" to the users touch, while still allowing the disk to be lifted out of the brake seat of the housing. It is within the scope of the present invention that the number of pins, pin location, orientation, degree of leverage, as well as the size, shape, location, orientation and relative relation of holes 47 may be altered in varied embodiments.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A braking actuator for a seat comprising:
    an ergonomic support;
    a housing comprising a pin slot, a frictional seat surface and an axle mount;
    a disk comprising a frictional disk surface, a pin load edge, a wire seat, a wire cam and an axle operatively engaged with said axle mount, said disk being disposed within said housing such that said frictional disk surface engages with said frictional seat surface;
    a Bowden cable operatively engaged with said ergonomic support at a first Bowden cable end and operatively engaged with said disk at a second Bowden cable end, wherein said second Bowden cable end is comprised of a wire wrapped around said wire cam; and
    a lever comprising a pin, said lever being disposed on said housing such that said pin extends through said pin slot to operatively engage said pin load edge such that said frictional disk surface can be disengaged from said frictional seat surface and said disk can be rotated;
    wherein turning said lever disengages said frictional disk surface from said frictional seat surface to actuate movement said ergonomic support and releasing said lever engages said frictional surfaces such that movement of said ergonomic support is braked.

2. The apparatus of claim 1, wherein said disk further comprises a pair of frictional disk surfaces and wherein said housing further comprises a pair of frictional seat surfaces at complementary wedge angles to said pair of frictional disk surfaces.

3. The apparatus of claim 1, wherein said wire seat is at a radius from said axle that is less a distance between said axle and said frictional disk surface.

4. The apparatus of claim 1, wherein said axle is centered in said housing.

5. The apparatus of claim 1, wherein said mount is oval.

6. The apparatus of claim 1, wherein a radius of said wire cam is less than a distance between said axle and said frictional disk surface.

7. The apparatus of claim 1, wherein said lever is oriented generally opposite a direction of wrapping of said Bowden cable wire around said wire cam.

8. The apparatus of claim 1, wherein said mount further comprises a means for permitting said axle to move away from said frictional seat surface and rotate.

9. The apparatus of claim 1, wherein said lever is a hand wheel.

10. A braking actuator system for a seat comprising:
  an ergonomic support, wherein said ergonomic support comprises an arching pressure surface for a lumbar support;
  a first frictional surface;
  a second frictional surface, said second frictional surface having a first position in contact with said first frictional surface and a second position spaced apart from said first frictional surface by a gap;
  means for moving said second frictional surface between said first position and said second position;
  means for rotating said second frictional surface relative to said first frictional surface; and
  a Bowden cable comprising a wire in a sleeve; wherein said sleeve is fixed relative to said first frictional surface and wherein said wire is connected to said second frictional surface and imparts a force thereto from said ergonomic support to force said second frictional surface into said first position and wherein rotation of said second frictional surface moves said wire relative to said sleeve, wherein said arching pressure surface provides said force to bias said second frictional surface to said first position.

11. The braking actuator system of claim 10, wherein said first frictional surface is comprised of sides of a housing and said second frictional surface is comprised of sides of a disk within said housing.

12. The braking actuator system of claim 11, wherein said sides of said housing further comprise a wedge angle complementary with said sides of said disk.

13. The braking actuator system of claim 10, wherein said moving means is comprised of an oval mount and a lever, wherein said fever is connected to said ergonomic support through said second frictional surface and said Bowden cable, wherein said second frictional surface is further comprised of a disk with an axle, and wherein said lever moves said axle within said oval mount.

14. The braking actuator system of claim 10, wherein said rotating means is comprised of a pin and a lever, wherein said lever is connected to said ergonomic support through said second frictional surface and said Bowden cable, wherein said first frictional surface is further comprised of a housing with a pin slot, and wherein said lever rotates said pin within said pin slot.

15. The braking actuator system of claim 10, wherein said Bowden cable wire is attached to said second frictional surface at a radius from said biasing means less than a distance between said biasing means and said first frictional surface.

16. The braking actuator system of claim 10, wherein said moving means is comprised of a mount and a lever, wherein said lever is connected to said ergonomic support through said second frictional surface and said Bowden cable, wherein said second frictional surface is further comprised of a disk with an axle, and wherein said lever moves said axle within said mount.

17. A braking actuator system comprising:
  a housing comprising a seat, a first friction surface and a mount, wherein said first friction surface further comprises a wedge angle in said seat;
  a disk comprising a second friction surface, a load edge, a wire seat and an axle, wherein said second friction surface further comprises an angle in said disk corresponding to said wedge angle in said seat, said disk further comprising a first position wherein said second friction surface contacts said first friction surface and a second position wherein a gap is between said second friction surface said first friction surface and wherein said axle slidingly and rotatingly engages with said mount; and
  a lever comprising a pin fixedly connected to said lever, wherein rotating said lever moves said disk away from said first friction surface and into said second position and said pin contacts said load edge and rotates said disk relative to said housing.

18. The braking actuator of claim 17, further comprising a Bowden cable comprising a wire in a sleeve; wherein said sleeve is fixed to said housing and said wire is connected to said disk and pulls said disk into said first position.

19. The braking actuator of claim 18, further comprising an ergonomic support operatively connected to said disk through said Bowden cable and imparting a force biasing said disk into said first position.

20. The braking actuator of claim 17, wherein said mount is oval, thereby providing said sliding and rotating engagement between said mount and said axle.

* * * * *

UNITED STATES PATENT AND TRADEMARK OFFICE
CERTIFICATE OF CORRECTION

PATENT NO. : 6,957,596 B2
DATED : October 25, 2005
INVENTOR(S) : Kopetzky et al.

It is certified that error appears in the above-identified patent and that said Letters Patent is hereby corrected as shown below:

Column 7,
Line 50, "wherein said fever is connected…" should read -- wherein said lever is connected --.

Signed and Sealed this

Twentieth Day of December, 2005

JON W. DUDAS
*Director of the United States Patent and Trademark Office*